Figure 1:
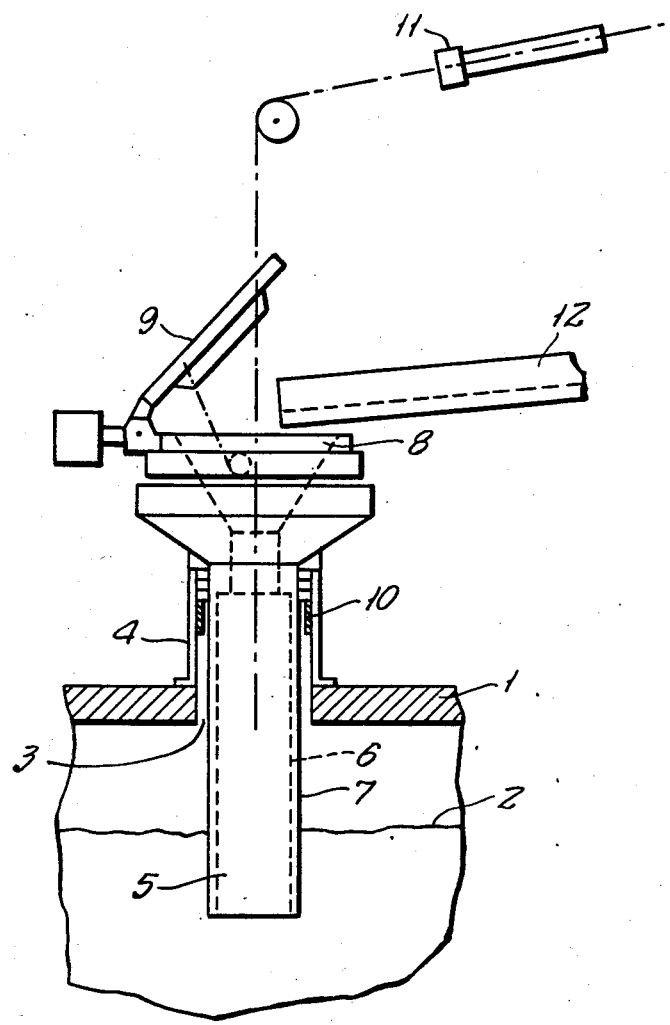

United States Patent [19]

Aune et al.

[11] Patent Number: 4,696,457
[45] Date of Patent: Sep. 29, 1987

[54] MEANS FOR CHARGING LIQUID SLAG TO A CLOSED SMELTING FURNACE

[75] Inventors: Jan A. J. Aune, Langhus; Knut K. Evensen, Andebu, both of Norway

[73] Assignee: Elkem a/s, Norway

[21] Appl. No.: 837,837

[22] Filed: Mar. 10, 1986

Related U.S. Application Data

[62] Division of Ser. No. 662,996, Oct. 19, 1984, Pat. No. 4,593,886.

[30] Foreign Application Priority Data

Nov. 4, 1983 [NO] Norway ............................. 834023

[51] Int. Cl.⁴ ............................................. C21C 7/10
[52] U.S. Cl. .................................... 266/207; 266/216
[58] Field of Search ................................ 266/207, 216

[56] References Cited

U.S. PATENT DOCUMENTS 3,459,346  8/1969  Tinnes .............................. 222/556
3,626,073 12/1971  Sindelar et al. ...................... 266/207

FOREIGN PATENT DOCUMENTS 234739  7/1964  Austria ............................. 266/216

Primary Examiner—Melvyn J. Andrews
Attorney, Agent, or Firm—Lucas & Just

[57] ABSTRACT

The present invention relates to a method and a means for charging liquid slag to a closed smelting furnace. The means for charging liquid slag comprises a double walled tube extending through an opening in the furnace roof, said tube being connected to means for raising and lowering the tube relatively to the furnace roof. Means for gas tight sealing are provided between the furnace roof and the double walled tube. A funnel shaped part is secured to the upper end of the tube, said funnel shaped part being equipped with a closeable lid for gas tight closing of the funnel shaped part. For charging of liquid slag to the furnace the tube is lowered down into the furnace to such an extent that the lower end of the tube is under the slag level in the furnace, whereafter the lid is opened and liquid slag is charged into the furnace. When charging of liquid slag is finished, the lid is closed and the tube is raised to such an extent that the lower end of the tube is above the slag level in the furnace. For cooling the tube a cooling medium with a boiling point below the slag temperature in the furnace is provided between the double walls of the tube. The cooling media will start to evaporate when the lower end of the tube is under the slag level in the furnace. The vapor is condensed in the funnel shaped part and condensed cooling medium is returned.

16 Claims, 1 Drawing Figure

MEANS FOR CHARGING LIQUID SLAG TO A CLOSED SMELTING FURNACE

This is a division of application Ser. No. 662,996, filed Oct. 19, 1984, now U.S. Pat. No. 4,593,886.

The present invention relates to a method and means for charging of liquid slag to a closed smelting furnace in a gas tight manner.

Closed smelting furnaces usually generates unburned or/and poisonous reaction gases which are collected below the furnace roof. It is therefore important that these gases are not allowed to escape from the furnace and into the environment on the outside of the furnace. Therefore electrodes, charging tubes etc. have to extend through the furnace roof in a gas tight manner.

For some smelting processes as e.g. sulphide ore smelting, it is desireable to return liquid slag to the smelting furnace or even to charge to the smelting furnace liquid slag which has been melted outside the furnace. For closed furnaces this liquid slag has to be charged in a gas tight manner in order to avoid escaping of hazardous reaction gases from the furnace and also to avoid air from entering the furnace. Such means for charging liquid slag to closed smelting furnaces are exposed to high temperature and wear and usually have a very short lifetime.

In accordance with the present invention there is provided a method and means for gas tight charging of liquid slag to closed smelting furnaces which are both simple and reliable.

Accordingly, the present invention relates to a method for gas tight charging of liquid slag to a closed smelting furnace where a slag launder comprising a double walled tube with a funnel shaped upper part is extending through an opening in the furnace roof, said slag launder before charging liquid slag to the furnace being lowered into the furnace to such an extent that the lower end of the double walled tube is under the slag level in the furnace, whereafter a lid on the top of the funnel shape part is opened and slag is charged. When the charging of slag is finished the lid is closed and the slag launder is then raised to a position where the lower end of the double walled tube is above the slag level in the furnace.

Preferably furnace gases in the tube and in the funnel shaped upper part of the tube are removed by blowing an inert gas before the slag launder is opened. In the same way air in the tube and in the upper funnel shaped part is preferably removed by blowing an inert gas into the tube before the slag launder is raised above the slag level in the furnace.

Further embodiments of the method according to the present invention will be evident from the following description and the claims.

The present invention further relates to means for gas tight charging of liquid slag to a smelting furnace said means comprising a tube which extend through an opening in the furnace roof and which can be raised and lowered relative to the furnace roof. The tube has an upper funnel shaped part and a closeable lid which is intended for gas tight sealing of the upper funnel shaped part of the tube.

The tube is preferably a double walled tube containing a cooling medium in the annular space between the double walls.

Further embodiments of the means according to the present invention will be evident from the following description and the claims.

The invention may be carried into practice in various ways, but one specific preferred embodiment thereof will now be described by way of example only and with reference to the accompanying drawings in which:

FIG. 1 shows a slag launder arranged in the furnace roof of a closed furnace.

In FIG. 1 there is shown parts of a furnace roof 1 for a smelting furnace. The slag level in the furnace is indicated by the reference numeral 2. In the furnace roof 1 there is provided an opening 3 into which a slag launder 4 extends. The slag launder 4 is used for gas tight charging of liquid slag to the furnace.

The slag launder 4 comprises a double walled tube 5 having an inner wall 6 and an outer wall 7 and an upper funnel shaped part 8. The annular space between the inner wall 6 and the outer wall 7 is intended to contain a cooling medium for cooling of the tube 5. The funnel shaped part 8 is equipped with channels (not shown on FIG. 1) for circulation of a cooling liquid e.g. water. The slag launder 4 can be gas tight closed by means of a closeable lid 9. The space between the slag launder 4 and the tube 5 is gas tight sealed by means of sealing ring 10.

The slag launder 4 can be raised and lowered by means of a device 11, e.g. an hydraulic cylinder or a mechanical hoisting apparatus.

When the slag launder 4 is not in use it is raised to a level where the lower end of the tube 5 is above the slag level 2 in the furnace. In this position the slag launder 4 is gas tight sealed by means of the lid 9.

Before charging liquid slag to the furnace the slag launder 4 is lowered into the furnace to such a level that the lower end of the tube 5 is under the slag level 2 in the furnace. Thereby an hydraulic seal is obtained, that is, the furnace gases can not escape from the furnace through the tube 5. The lid 9 is now opened and liquid slag is charged to the upper funnel shaped part 8 via a runner 12 and runs down into the furnace through the tube 5. When the charging of liquid slag is finished, the lid 9 is closed and the slag launder 4 is raised to a position where the lower end of the tube 5 is above the slag level 2 in the furnace. In this way liquid slag is charged without allowing furnace gases to escape and air to enter the furnace.

As set out above any hazardous gases in the tube 5 and in the funnel shaped part 8 can be removed before and after charging of liquid slag by blowing an inert gas into the tube 5. Means for blowing an inert gas into the tube 5 is not shown on FIG. 1.

When the lower end of the tube 5 is lowered to a position under the slag level in the furnace, the tube 5 is exposed to extremely high temperature stress as the slag temperature is very high. Further the tube 5 is exposed to mechanical and chemical wear from the slag.

In order to reduce the temperature stress and the mechanical and chemical wear on the tube 5, the tube 5 is cooled by evaporation cooling. As set out above the tube 5 is double walled having an inner wall 6 and an outer wall 7. The annular space between the walls 6 and 7 in the tube 5 is filled with a cooling medium. The cooling medium can be in liquid or solid state by atmospheric pressure and room temperature. The cooling medium which is used is selected according to its boiling point so that the cooling medium will boil when the lower end of the tube 5 is under the slag level in the furnace, but not when the tube 5 is raised to a position above the slag level. When the lower end of the tube 5 is under the slag level in the furnace, the cooling medium is heated and will start to boil. The vapour will rise to the top of the slag launder 4. In the upper part of the slag launder 4 there is provided channels for a cooling liquid. When the vapour from the cooling medium comes into contact with the channels for cooling liquid in the upper part of the slag launder 4, the vapour will condense. The condensed vapour will then run down into the tube 5 again. The amount of heat which is transported in the vapour and which is removed by condensation of the vapour is very great.

As great amounts of heat is transported through the walls in the tube 5 to the boiling cooling medium, the temperature of the slag which is in contact with the outer wall of the tube 5 will be lowered to such an extent that a layer of frozen slag will be deposited on the end of the tube 5 which is under the slag level in the furnace. This layer of frozen slag will protect the tube 5 and increase its lifetime.

As long as the lower end of the tube 5 is under the slag level in the furnace, the boiling cooling medium will suck heat from the slag. When the slag launder is raised to a position where the lower end of the tube 5 is above the slag level, the temperature stress on the tube is considerably reduced as the gas temperature above the slag level is considerably lower than the slag temperature which can be up to ca. 1,800° C. It is therefore preferred to use a cooling medium with a boiling point which is about the gas temperature in the furnace. The cooling medium will thereby stop boiling when the slag launder is raised to its upper position and the heat losses from the slag launder is thereby reduced to a minimum between each charging of liquid slag. In this way the heat losses from the furnace are kept on a low level. Cooling and transport of heat is high only when it is necessary, that is when the lower end of the tube 5 is under the slag level in the furnace.

The method and means according to the present invention can be used for all slag melting processes as e.g. in connection with smelting of copper, lead, nickel, chromium, manganese, iron etc. when charging of liquid slag is a part of the process.

What is claimed is:

1. An apparatus for charging liquid slag to a roofed smelting furnace containing slag and a furnace gas comprising:
   (a) a movable tube member for positioning in the roof, said tube member having an upper end which will be positioned above the roof and a lower end which will be positioned below the roof;
   (b) a gas-tight lid member for closing the upper end of said tube member which will thereby prevent furnace gas from escaping through said tube member; and
   (c) means for moving said tube member between a first position where the lower end of said tube member will be below the slag level and a second position where the lower end of said tube member will be above the slag level thereby allowing liquid slag to be charged to said furnace and preventing furnace gas from escaping from said furnace when said apparatus is positioned in the roof and said tube member is in said first position.

2. The apparatus of claim 1 further comprising means for blowing a gas into said tube member.

3. The apparatus of claim 1 wherein said tube member is double walled, having an inner wall and an outer wall, said inner wall and outer wall defining a space therebetween.

4. The apparatus of claim 2 wherein said gas is an inert gas.

5. The apparatus of claim 3 further comprising a cooling medium in said space.

6. The apparatus of claim 5 wherein the tube member has channels for transporting of cooling medium.

7. The apparatus of claim 5 wherein said cooling medium has a boiling point such that said cooling medium will boil when the lower end of said tube member is in said first position thereby cooling the lower end of said tube member.

8. The apparatus of claim 6 wherein said cooling medium has a boiling point such that said cooling medium will boil when the lower end of said tube member is in said first position thereby cooling the lower end of said tube member.

9. An apparatus for charging liquid slag to a roofed smelting furnace containing slag and a furnace gas comprising:
   (a) a movable tube member having an upper end and a lower end, said tube member for mounting in the roof such that the upper end will be positioned above the roof and the lower end will be positioned below the roof;
   (b) a gas-tight lid member for closing the upper end of said tube member which will thereby prevent furnace gas from escaping through said tube member; and
   (c) means for moving said tube member between a first position where the lower end of said tube member will be below the slag level and a second position where the lower end of said tube member will be above the slag level thereby allowing liquid slag to be charged to said furnace and preventing furnace gas from escaping from said furnace when said apparatus is positioned in the roof and said tube member is in said first position.

10. The apparatus of claim 9 further comprising means for blowing a gas into said tube member.

11. The apparatus of claim 9 wherein said tube member is double walled, having an inner wall and an outer wall, said inner wall and outer wall defining a space therebetween.

12. The apparatus of claim 10 wherein said gas is an inert gas.

13. The apparatus of claim 11 further comprising a cooling medium in said space.

14. The apparatus of claim 13 wherein said cooling medium has a boiling point such that said cooling medium will boil when the lower end of said tube member is in said first position thereby cooling the lower end of said tube member.

15. An apparatus for charging liquid slag to a roofed smelting furnace containing slag and a furnace gas comprising:
   (a) a movable tube member having an upper end and a lower end, said tube member for mounting in a gas-tight manner in the roof such that the upper end will be positioned above the roof and the lower end will be positioned below the roof, said tube member being double walled having an inner wall and an outer wall, said inner wall and outer wall defining a space therebetween;

(b) a gas-tight lid member for closing the upper end of said tube member which will thereby prevent furnace gas from escaping through said tube member; and
(c) means for blowing a gas into said tube member;
(d) a cooling medium positioned in said space for cooling said tube member; and
(e) means for moving said tube member between a first position where the lower end of said tube member will be below the slag level and a second position where the lower end of said tube member will be above the slag level thereby allowing liquid slag to be charged to said furnace and preventing furnace gas from escaping from said furnace when said apparatus is positioned in the roof and said tube member is in said first position.

16. An apparatus for charging liquid slag to a closed smelting furnace containing slag and a furnace gas comprising:

(a) a movable tube member having an upper end and a lower end, said tube member for mounting in a gas-tight manner in said furnace such that the upper end will be positioned outside the furnace and above the level of slag in the furnace and the lower end will be positioned inside said furnace;
(b) a gas-tight lid member for closing the upper end of said tuber member which will thereby prevent furnace gas from escaping through said tube member; and
(c) means for moving said tube member between a first position where the lower end of said tube member will be below the slag level and a second position where the lower end of said tube member will be above the slag level thereby allowing liquid slag to be charged to said furnace and preventing furnace gas from escaping from said furnace when said apparatus is mounted in said furnace and said tube member is in said first position.

* * * * *

UNITED STATES PATENT AND TRADEMARK OFFICE
CERTIFICATE OF CORRECTION

PATENT NO.   :   4,696,457

DATED        :   September 29, 1987

INVENTOR(S)  :   Jan A. J. Aune et al.

It is certified that error appears in the above-identified patent and that said Letters Patent is hereby corrected as shown below:

Column 1, line 42, change "shape" to --shaped--.

Column 3, line 17, after "wall" insert --7--.

Column 6, line 8, change "tuber" to --tube--.

Signed and Sealed this

Eighth Day of March, 1988

Attest:

DONALD J. QUIGG

Attesting Officer

Commissioner of Patents and Trademarks